Patented July 23, 1946

2,404,713

UNITED STATES PATENT OFFICE 2,404,713

METHOD FOR PREPARING POLYMERIC SOLUTIONS

Ray Clyde Houtz, Snyder, N. Y., assignor to E. I. du Pont de Nemours & Company, Wilmington, Del., a corporation of Delaware No Drawing. Application June 23, 1943, Serial No. 491,945

13 Claims. (Cl. 260—32)

This invention is concerned with the preparation of solutions of polymeric materials and it relates particularly to the dissolving of polymers of acrylonitrile.

This application is a continuation-in-part of my copending application Serial No. 447,446, filed June 17, 1942.

My said copending application Serial No. 447,446, and that of George Henry Latham Serial No. 447,466, filed June 17, 1942, describe procedures for dissolving acrylonitrile polymers in volatile organic solvents with the production of solutions which are capable of being extruded through suitable apparatus to form shaped articles, such as filaments, films and the like. Organic solvent solutions of acrylonitrile polymers prepared as described in said copending applications show no tendency for the polymers to separate out from solution at ordinary or low temperatures, for example, room temperature (75° F.) or lower, but it is difficult to initially prepare such solutions, at ordinary temperatures of the order of 80° F. or less, by merely stirring the polymer with the solvent because of the tendency of the polymer particles to become swollen and covered with a viscous coating which hinders the dissolving action of the solvent, the polymer particles tending to aggregate or "ball." This "balling" tendency can be overcome with dissolving of the polymer by stirring the mixture of polymer and solvent vigorously for extended periods of time at elevated temperatures but the resulting solutions are highly colored and are therefore not completely satisfactory for the production of shaped articles, such as filaments and films. The initial appearance of color can be somewhat retarded by stirring the polymer and solvent in an oxygen-free atmosphere but, even with the use of this expedient, an undesirable amount of color develops before the polymer is completely dissolved.

It is an object of this invention to provide substantially colorless (water white or very light amber) solutions of polymeric materials which, in solution, are sensitive to heat and become colored on prolonged exposure to elevated temperatures and which can be dissolved only with difficulty. A specific object of the invention pertains to a method for forming a substantially colorless solution of an acrylonitrile polymer dissolved in a suitable solvent. Additional objects will become apparent from the description hereinafter set forth.

The objects of the invention are accomplished in general by stirring a substantially colorless polymer which normally develops color on prolonged exposure at elevated temperatures, i. e., 100° C. to 150° C. and higher, in a finely divided state, in a solvent under conditions at which the solvent has little or no dissolving effect on the polymer. By following this procedure, the polymer-solvent mixture is converted into a uniform slurry after a relatively short period of time with substantially no tendency of the polymer to "ball." The slurry is then heated to a temperature, such as 150° C., at which the solvent exercises a strong dissolving effect on the polymer, and, in a short time, generally not in excess of one hour, is converted to a homogeneous, substantially colorless solution.

The following examples in which parts, proportions and percentages are by weight, unless otherwise specified, illustrate methods for the treatment of acrylonitrile polymers to form useful solutions in accordance with this invention:

Example I 100 parts of polymerized acrylonitrile, having an average molecular weight of 66,000, are ground to a particle size of 20 mesh and added to 300 parts of dimethyl formamide which have previously been cooled to 0° C., the mixture being vigorously stirred. After about 1 minute, the low viscosity slurry initially obtained is transformed to a white, highly viscous, dough-like mass which contains discrete particles of the polymer, which particles, however, do not tend to "ball" or coalesce on standing. The stirring is then discontinued and the mass is heated over a period of approximately 45 minutes to a temperature of 150° C., whereupon a substantially colorless solution is obtained having a viscosity of approximately 60 poises. During this heating period, the original dough-like mass remains visually unchanged until, at a temperature of approximately 60° C. to 80° C., it becomes clear and transparent. This transparent mass however, although of much lower viscosity than the original, dough-like mass, does not possess stable viscosity characteristics until it has been heated to approximately 150° C. The solution obtained at this latter temperature exhibits stable viscosity characteristics on repeated cooling and heating. It does not separate out on cooling to room temperature or lower. The solution when obtained is substantially colorless. It can be maintained at temperatures of from 100° C. to 150° C. for periods of 30 minutes to 1 hour without becoming colored to any appreciable extent. However, if maintained for longer periods or at higher temperatures, it becomes highly colored.

In contrast to the method of this example, if 100 parts of the same acrylonitrile polymer, finely divided or not, are stirred with 300 parts of dimethyl formamide at room temperature or slightly higher, the polymer particles coalesce and form into difficultly soluble balls. To effect solution of the polymer, it is necessary to stir the mass vigorously for a period of approximately 3 hours at a temperature of 150° C. The solution obtained is golden to dark brown in color and is, therefore, not completely desirable for use in the manufacture of shaped articles, such as films, filaments and the like.

Example II 18 parts of acrylonitrile polymer, having an average molecular weight of approximately 140,000, are ground to a particle size of 50 mesh and added to 82 parts of N-formyl hexamethylene imine which have previously been cooled to 0° C. The mixture is vigorously stirred for approximately 1 minute, at the end of which time the highly viscous, dough-like mass obtained is heated rapidly with slow stirring. When heated to a temperature of about 60° C. (after 10 minutes of heating), the mass becomes clear and transparent and exhibits a viscosity of approximately 3,800 poises. Further rapid heating to 150° C. (over an additional period of 15 minutes) results in a clear, substantially colorless solution possessing a viscosity of approximately 60 poises. If maintained at this temperature for periods of 1 or more hours, the solution becomes colored. If cooled, the solution remains clear and homogeneous but becomes more viscous. For example, at temperatures of 120° C., 90° C. and 33° C., the solution exhibits viscosities of 585 poises, 1,280 poises and 10,930 poises, respectively.

On the other hand, the solution obtained by stirring 18 parts of the acrylonitrile polymer of this example with 82 parts of N-formyl hexamethylene imine maintained at 150° C. for a period of 2 hours possesses a dark brown color. It resembles the above substantially colorless solution with regard to such properties as changes in viscosity with temperature, stability at low temperatures, etc., but is not so desirable for use in the preparation of shaped articles because of the objectionable color.

Example III 100 parts of the acrylonitrile polymer used in Example I are added to 300 parts of dimethyl formamide and 30 parts diethyl ether. The mixture is stirred very vigorously at a temperature of 15° C. for a period of 2 minutes, at the end of which period a uniform slurry is formed. The slurry is heated up to 140° C. over a period of 30 minutes and maintained at that temperature for a further period of 15 minutes, at the end of which period a homogeneous, colorless solution is obtained having a viscosity of approximately 80 poises at 140° C., the ether being rapidly removed during the initial heating period.

The acrylonitrile polymer treated in accordance with this invention is preferably prepared by the ammonium persulfate catalyzed polymerization of monomeric acrylonitrile dissolved or emulsified in water. It can, however, be prepared by any other suitable type of polymerization reaction, such as, for example, the emulsion-type reaction disclosed by United States Patent No. 2,160,054 to Bauer et al. The polymer preferably possesses a molecular weight within the range of 25,000 to 750,000, or even higher, as calculated from viscosity measurements by the Staudinger equation:

$$\text{Molecular weight} = \frac{N_{sp}}{K_m C}$$

wherein $K_m = 1.5 \times 10^{-4}$ $N_{sp} = \text{specific viscosity} = \frac{\text{viscosity of solution}}{\text{viscosity of solvent}} - 1$ and $C$ = concentration of the solution expressed as the number of moles of the monomer (calculated) per liter of solution.

The molecular weight of the polymer obtained is dependent on such factors as the concentration of the monomer in the water, the amount and type of catalyst present, the temperature of the reaction, etc. When the monomer is present in 5% aqueous solution maintained at a temperature of from 3° C. to 5° C., it is found that the use of 4% of ammonium persulfate catalyst (based on the weight of the acrylonitrile) results in the formation of a polymer having a molecular weight (as calculated by the above equation) of approximately 60,000. Increasing or decreasing the amount of the catalyst, while maintaining the other conditions constant, decreases or increases the molecular weight of the polymer.

Although the invention is particularly concerned with the treatment of simple polymers of acrylonitrile, it is to be understood that the invention can be utilized to produce satisfactory solutions of other polymers of acrylonitrile which can be dissolved only in a limited number of solvents and at a temperature of 100° C. and above. Such polymers tend to develop color when subjected to prolonged heating in solution. Examples of such polymers, other than the simple acrylonitrile polymers, are copolymers or interpolymers of acrylonitrile containing at least 85% by weight of combined acrylonitrile. Thus, the invention contemplates within its scope the treatment of acrylonitrile polymer which has been interpolymerized with polymerizable substances, such as vinyl acetate, vinyl chloride, acrylic acid, its esters and homologues, styrene, isobutylene and other polymerizable substances; copolymers produced by the copolymerization of acrylonitrile monomer with such other polymerizable substances are also included.

Any of the solvents utilized in the said copending applications of Houtz and Latham may be used, and these solvents include dimethyl formamide, dimethyl methoxy-acetamide, N-formyl morpholine, N-formyl hexamethylene imine, and tetramethylene cyclic sulfone.

According to the principles of this invention, the polymer is very finely divided (particle size of not more than 20 mesh and preferably much smaller, for example 100 mesh or even smaller) and mixed with cooled solvent to form a thin slurry that spontaneously sets to a highly viscous, dough-like mass that can then be heated very rapidly without separation or "balling" of the polymer particles to a temperature of approximately 150° C. to form a substantially colorless solution.

The solvent can be cooled to below 0° C. if desired prior to mixing with the polymer. However, in such a case, the slurry does not set so rapidly to the dough-like mass that is subsequently heated to form the solution. On the other hand, if the solvent is not cooled at least to 5° C. before the addition of the polymer, the formation of the slurry is impaired and the polymer particles tend to "ball" and become difficultly soluble in the solvent.

It is found to be particularly advantageous to modify the solvent prior to its being slurried with the polymer by mixing it with a miscible, low boiling, non-solvent which reduces the action of the solvent on the polymer, subsequent heating of the slurry then effecting removal of the non-solvent and causing the polymer to dissolve in the remaining solvent. This procedure prevents the partial swelling of the polymer particles during slurrying and completely eliminates the tendency of the solvent, even at low temperatures, to resist dispersion due to the viscous coating formed by the solvent action of the polymer and, by thus eliminating the solvent action, a completely dispersed slurry is formed in a much shorter period of time than would otherwise be possible. This form of the invention is illustrated in Example III above and does not require the use of a very low temperature, such as 0° C. Temperatures up to 60° C. may be used under this procedure although it is beneficial to use low temperatures, even as low as 0° C. and lower. Diethyl ether is a very satisfactory material to use in this modified procedure since it is highly volatile and readily removed on heating and since only a small amount, i. e. in the neighborhood of 10%, based on the weight of the solvent, need be added. Other miscible non-solvents for acrylonitrile polymers can be used in place of ether; for example, water and acetone in an amount of about 5% and 20% respectively, based on the weight of the solvent, may be used in place of diethyl ether to completely eliminate the tendency of the polymer particles to "ball" during heating.

It is preferred that the proportions of polymer and solvent used in the preparation of the slurry and viscous mass be those desired in the final solution. However, smaller amounts of the solvent can be used if desired, the remaining amount of solvent being added to the solution after its formation. For example, a solution similar to that obtained in Example I above can be prepared by stirring the finely divided polymer (100 parts) with 200 parts of the cooled solvent, the viscous mass obtained from the slurry being heated to 150° C. to form a colorless concentrated solution to which the remaining 100 parts of solvent can be added. In no case, however, should further amounts of the dry, solid polymer be added to the heated solution since this will result in "balling" of the added particles, the added time and high temperature required for the solution of these "balls" resulting in the formation of color in the solution.

The heating of the highly viscous mass obtained from the slurry is preferably carried out as rapidly as possible. In no case should it require more than 1 hour if a colorless solution is to be obtained. This requirement obviously limits the volume of solution that can be prepared with a given piece of heating equipment when the heating is accomplished in a batch manner. On the other hand, the process lends itself admirably to a continuous process wherein a small stream of the viscous mass is continuously and rapidly led through a heating zone capable of heating the mass to a temperature of at least 150° C. On the other hand, when less than the desired total amount of solvent is employed in forming the slurry and viscous mass, the mass can be immediately formed into the final colorless solution by adding the mass with stirring to the remaining solvent, which is maintained at 150° C. In such a case, of course, the addition of the mass must be quite rapid and should in no case require more than 1 hour if a colorless solution is to be obtained.

As indicated in the examples, the viscous mass can, if desired, be stirred during the time it is being heated to 150° C. This is not necessary since the mass is stable and the polymer particles contained within it show no tendency to "ball" and become difficultly soluble. Stirring, if employed however, does improve the transfer of heat throughout the mass and minimizes the possibility of local over heating and color formation.

It has been mentioned in the examples that the viscous mass becomes clear and transparent during the course of its heating when a temperature of from 60° C. to 80° C. is reached. Although this transparent mass outwardly resembles the final solution, it does not possess stable viscosity characteristics and is not suited for extrusion into shaped articles, such as films, filaments, etc. It does not acquire these characteristics until it has been heated to approximately 150° C. The solution obtained at this temperature is admirably suited for such extrusion purposes. Of course, if the viscosity of the solution at this temperature is such as to make the solution undesirable for extrusion purposes, this can be adjusted by cooling or heating the solution. As mentioned in the applications to Houtz Serial No. 447,446 and Latham Serial No. 447,466 previously referred to, the solution at the time of extrusion should preferably possess a viscosity of from 25 to 750 poises, although this range is dependent on the particular type of extrusion apparatus employed.

In the same manner, the exact concentration of the solution to be extruded will also depend on the type of shaped article to be formed and extrusion apparatus employed. Conventional apparatus generally requires that the solution contain from 15% to 30% polymer by weight and the process of this invention is admirably suited for the preparation of such solutions in a colorless state. The process is not, however, limited to the preparation of solutions of such concentration. It can be used to advantage in the preparation of polymeric solutions of almost any given concentration.

Certain of the solvents for acrylonitrile polymers previously mentioned are solids at the low temperatures specified in this application for the preparation of the slurry and viscous, dough-like mass. For example, the m- and p-nitrophenols have melting points of 97° C. and 114° C. respectively. These solvents can, however, be employed in accordance with the principles of this invention to prepare solutions of acrylonitrile polymers for use in the manufacture of shaped articles that are free of objectionable color. For example, the solid solvent can be dissolved in a small amount of a liquid non-solvent for the polymer, such as alcohol, or of a liquid solvent for the polymer and solid solvent, such as dimethyl formamide, the solvent solution being first cooled to the low temperature of this invention before being formed into a slurry with the finely divided polymer. Such a slurry will also set spontaneously to a highly viscous, dough-like mass that can then be rapidly heated without separation and "balling" of the polymer to form the final desired solution. As an alternative procedure, the solid solvent can be finely ground (particle size not greater than 20 mesh) and formed with the also finely divided polymer into a slurry in a mutual non-solvent, such as petroleum ether, the slurry being formed at the low temperature of this invention and then being rapidly heated to form the desired solution. The solutions formed by either of these procedures resemble the solutions of Examples I and II above and can be extruded in the manner set forth in the application to Houtz, Serial No. 447,446, to form shaped articles of the polymer, or they can be cooled and stored indefinitely for later use without separating or becoming colored.

By the term "volatile organic solvent," as used throughout the specification and claims, is meant an organic solvent which may be removed substantially completely by evaporation from a solution prepared therewith.

The method of this invention, however, is generally applicable to the preparation of solutions of any given polymeric substance in a suitable solvent. However, it is especially suited for use with those polymers that tend to darken when their solutions are maintained at elevated temperatures for prolonged periods of time. Typical polymers of this nature include polymers prepared wholly or in part from monomeric vinyl or acrylic compounds other than acrylonitrile.

This invention provides a method for the preparation of colorless or only very slightly colored solutions of polymeric materials, such as polymers of acrylonitrile that tend to decompose upon exposure to elevated temperatures in solution.

Since it is obvious that many changes and modifications can be made in the above-described details without departing from the nature and spirit of the invention, it is to be understood that the invention is not to be limited thereto except as set forth in the appended claims.

I claim:

1. The process of forming clear and substantially colorless solutions of an acrylonitrile polymer containing at least 85% by weight of combined acrylonitrile, which comprises commingling such polymer in a finely divided form with a solvent having marked dissolving power for said polymer at high temperatures while maintaining the polymer in the form of discrete particles, and thereafter heating the mass to a temperature at which said solvent dissolves said polymer.

2. The process of forming a clear and substantially colorless solution of a polymer of acrylonitrile containing at least 85% by weight of combined acrylonitrile, which comprises commingling such acrylonitrile polymer in a finely divided form with a solvent having marked dissolving power for said polymer at high temperatures while maintaining the polymer in the form of discrete particles, rapidly stirring the mixture to form a slurry, permitting said slurry to set to a viscous dough-like mass, and thereafter rapidly heating said mass to a temperature at which said solvent dissolves said polymer.

3. The process of forming a clear and substantially colorless solution of a polymer of acrylonitrile containing at least 85% by weight of combined acrylonitrile, which comprises cooling a solvent having marked dissolving power for such acrylonitrile polymer at high temperatures to a low temperature at which said solvent has little solvent action on said polymer, commingling said polymer in a finely divided state with said cooled solvent, rapidly stirring the mixture to form a slurry, permitting said slurry to set to a viscous dough-like mass, and thereafter rapidly heating the mass to a temperature at which said solvent dissolves said polymer to form a substantially colorless solution.

4. A process as defined in claim 3 wherein the low temperature does not exceed approximately 15° C.

5. A process as defined in claim 3 wherein the low temperature is approximately 0° C.

6. The process of forming a clear and substantially colorless solution of polyacrylonitrile having a molecular weight between 25,000 and 750,000, which comprises cooling a solvent having marked dissolving power for such acrylonitrile polymer at high temperatures to a temperature of approximately 0° C., commingling said polymer in a finely divided state with said cooled solvent, rapidly stirring the mixture to form a slurry, permitting said slurry to set to form a viscous dough-like mass, and thereafter rapidly heating the mass to a temperature of approximately 150° C. to form a substantially colorless solution.

7. The process of forming a clear and substantially colorless solution of polyacrylonitrile having a molecular weight between 25,000 and 750,000, which comprises cooling dimethyl formamide to a temperature of approximately 0° C., commingling said polymer in a finely divided state with said cooled dimethyl formamide, rapidly stirring the mixture to form a slurry, permitting said slurry to set to form a viscous dough-like mass, and thereafter rapidly heating the mass to a temperature of approximately 150° C. to form a substantially colorless solution.

8. The process of forming a clear and substantially colorless solution of polyacrylonitrile having a molecular weight between 25,000 and 750,000, which comprises cooling tetramethylene cyclic sulfone to a temperature of approximately 0° C., commingling said polymer in a finely divided state with said cooled tetramethylene cyclic sulfone, rapidly stirring the mixture to form a slurry, permitting said slurry to set to form a viscous dough-like mass, and thereafter rapidly heating the mass to a temperature of approximately 150° C. to form a substantially colorless solution.

9. The process of forming a clear and substantially colorless solution of a polymer of acrylonitrile containing at least 85% by weight of combined acrylonitrile, which comprises commingling such polymer in a finely divided form with a solvent mixture containing a solvent having marked dissolving power for said acrylonitrile polymer at high temperatures and a miscible volatile liquid which is a non-solvent for said polymer and is more volatile than said solvent, rapidly stirring the mixture to form a slurry, permitting said slurry to set to a viscous dough-like mass, and thereafter rapidly heating the mass to a temperature at which said non-solvent is removed and the remaining solvent dissolves said polymer to form a substantially colorless solution.

10. A method as defined in claim 9 wherein the temperature of the solvent mixture prior to commingling with the polymer is not in excess of 60° C.

11. A method as defined in claim 9 wherein the solvent mixture is precooled to a temperature of approximately 0° C.

12. The process of forming a clear and substantially colorless solution of polyacrylonitrile having a molecular weight between 25,000 and 750,000, which comprises commingling such polymer in a finely divided form with a solvent mixture containing dimethyl formamide and diethyl ether, rapidly stirring the mixture to form a slurry, permitting said slurry to set to a viscous dough-like mass, and thereafter rapidly heating the mass to a temperature of approximately 150° C. to remove the diethyl ether and form a substantially colorless solution.

13. The process of forming a clear and substantially colorless solution of polyacrylonitrile having a molecular weight between 25,000 and 750,000, which comprises commingling such polymer in a finely divided form with a solvent mixture previously cooled to 0° C. and containing dimethyl formamide and diethyl ether, rapidly stirring the mixture to form a slurry, permitting said slurry to set to a viscous dough-like mass, and thereafter rapidly heating the mass to a temperature of approximately 150° C. to remove the diethyl ether and form a substantially colorless solution.

RAY CLYDE HOUTZ.